(12) United States Patent
Kakarala et al.

(10) Patent No.: US 10,055,708 B2
(45) Date of Patent: Aug. 21, 2018

(54) VEHICLE INVENTORY VERIFICATION SYSTEM, APPARATUS AND METHOD CROSS REFERENCE TO RELATED APPLICATIONS

(71) Applicant: Halcyon Consulting, LLC, Columbia, MD (US)

(72) Inventors: Srinivas Kakarala, Ellicott City, MD (US); Kartikeya Kakarala, Irving, TX (US)

( * ) Notice: Subject to any disclaimer, the term of this patent is extended or adjusted under 35 U.S.C. 154(b) by 0 days.

(21) Appl. No.: 14/849,175

(22) Filed: Sep. 9, 2015

(65) Prior Publication Data

US 2016/0071054 A1  Mar. 10, 2016

Related U.S. Application Data

(60) Provisional application No. 62/047,999, filed on Sep. 9, 2014.

(51) Int. Cl.
*G06Q 10/00* (2012.01)
*G08B 13/22* (2006.01)
*G06Q 10/08* (2012.01)

(52) U.S. Cl.
CPC .................................. *G06Q 10/087* (2013.01)

(58) Field of Classification Search
CPC ................. G06Q 10/08; G08B 13/22
USPC ............ 705/28; 340/572.1; 701/31.4
See application file for complete search history.

(56) References Cited

U.S. PATENT DOCUMENTS

| | | | | |
|---|---|---|---|---|
| 7,356,394 B2* | 4/2008 | Burgess | ............... | G06Q 10/087 701/29.3 |
| 8,452,673 B2* | 5/2013 | Boling | ............... | G06Q 10/06 701/24 |
| 8,650,098 B2* | 2/2014 | Rangel | ............... | G06Q 10/087 340/988 |
| 2003/0055666 A1* | 3/2003 | Roddy | ............... | B61L 27/0094 705/305 |
| 2004/0068442 A1* | 4/2004 | Ertle | ............... | G06Q 30/02 705/26.8 |
| 2007/0109094 A1* | 5/2007 | Sahai | ............... | B60R 25/04 340/5.72 |
| 2007/0260375 A1* | 11/2007 | Hilton | ............... | G01M 17/007 701/33.4 |
| 2007/0273534 A1* | 11/2007 | McGinn | ............... | G06Q 10/00 340/572.8 |
| 2008/0176713 A1* | 7/2008 | Olivera Brizzio | ............... | A63B 24/00 482/8 |

(Continued)

*Primary Examiner* — Oluseye Iwarere (57) ABSTRACT

A system, method, and devices are disclosed for remotely verifying and managing the record of an inventory asset, such as an automobile or other vehicle, wherein the asset in the inventory is located at a site remote from a user initiating a request for verification. A user selects from a web-based interface on a client device or mobile application the location of an asset to be verified. When an inventory verification request is initiated, a request is sent electronically to a base station/transmitter located at the dealer's location. The transmitter sends a signal out to verify the inventory in the dealer's to one or more receivers installed in each vehicle/inventory object. The receivers communicate data associated with vehicles/inventory objects present in the dealer's lot back to the transmitted request with the list of data representing the inventory.

7 Claims, 7 Drawing Sheets

(56) References Cited

U.S. PATENT DOCUMENTS

| | | | | |
|---|---|---|---|---|
| 2008/0228346 A1* | 9/2008 | Lucas | G06Q 10/087 | 701/31.4 |
| 2008/0231446 A1* | 9/2008 | Cresto | G06Q 10/087 | 340/572.1 |
| 2010/0070365 A1* | 3/2010 | Siotia | G01C 21/20 | 705/14.49 |
| 2011/0227709 A1* | 9/2011 | Story | B60R 25/102 | 340/10.42 |
| 2011/0295724 A1* | 12/2011 | Hill | G06Q 10/087 | 705/28 |
| 2012/0123951 A1* | 5/2012 | Hyatt | G06Q 10/20 | 705/305 |
| 2013/0173411 A1* | 7/2013 | Heppe | G06Q 30/0639 | 705/26.3 |
| 2014/0207629 A1* | 7/2014 | Bradley | B60R 25/00 | 705/28 |
| 2014/0279293 A1* | 9/2014 | Morgan | G06Q 10/087 | 705/28 |
| 2015/0193726 A1* | 7/2015 | Simmons | G06Q 10/087 | 705/28 |
| 2015/0242516 A1* | 8/2015 | Lester | G06F 17/30867 | 707/722 |

\* cited by examiner

VEHICLE INVENTORY VERIFICATION SYSTEM, APPARATUS AND METHOD CROSS REFERENCE TO RELATED APPLICATIONS

CROSS REFERENCE TO RELATED APPLICATIONS

This application claims the benefit of U.S. Provisional Patent Appl. No. 62/047,999 filed on Sep. 9, 2014, the contents of which are hereby incorporated by reference in their entirety.

FIELD OF INVENTION

The present invention, and various embodiments thereof, relates to inventory management, but not exclusively, to systems and methods of remotely verifying a vehicle inventory via a portable device.

BACKGROUND

Currently, there are no Dealer or Financier/Auditor electronic solutions in place that enable a vehicle to communicate its status and location in response to a request from a handheld mobile device or remote client terminal, Dealers, Banks, financial institutions or third party inventory management systems/vendors today utilize a third-party auditor or a manual process where the individual needs to be present at the dealership, to verify the inventory. There are several costs associated with retaining an auditor or an employee, including but not limited to travel, payroll, employee benefits and reporting expenses, involved with this process.

SUMMARY OF INVENTION

Described herein is a system, method, and devices for remotely verifying and managing the record of an inventory asset, such as an automobile or other vehicle, wherein the asset in the inventory is located at a site remote from a user initiating a request for verification.

In one embodiment, a user, such as a bank or financial institution's representative, selects from a web-based interface on a client device or mobile application on a portable terminal, the location of an asset to be verified. For example, the user can select specific criteria, such as a car dealership—by name or location, from whose inventory they need to verify an asset for which they will be providing or have provided financing. When an inventory verification request is initiated, a request is sent electronically from the client device of the financial institution initiating the verification to a base station/transmitter located at the dealer's location. This transmitter sends a signal out to verify the inventory in the dealer's lot. In one embodiment, receivers are installed in each vehicle/inventory object. The receivers communicate with the transmitter with the list of all data associated with vehicles/inventory objects present in the dealer's lot and reply back to the transmitted request with the list of data representing the inventory. The transmitter then sends a compiled list of vehicles/inventory objects and their analytics to a server and/or data center where it is stored and further converted to a tabular or graphical format and relayed back to the user's device, in response to the initial request, all in a close to real-time timeframe.

This solution provides technical efficiencies to what is considered a huge manual process with large overheads for the parties involved. Example 1: financial organizations that finance high value inventories like vehicles in a car dealership, motorbikes, boats or RV inventories, etc. Today the organizations financing these inventories have auditors that physically visit the dealers' lots to verify the inventory, this presents a significant financial and process overhead for these organizations to retain the auditors in their payroll and also this process is open to occasional human induced flaws if the auditors were not honest with their findings. Example 2: Dealerships that maintain inventories like vehicles in a car dealership, motorbikes, boats or RV inventories, etc. do not always have the accurate details about the vehicle at hand or the whereabouts of the vehicle on the dealership lot. There could be cases where the vehicle could be low on fuel or the dealer searching for the vehicle, when there is a customer waiting to test-drive it. This could be a lost sale opportunity for the dealer. To address such issues today, there is an employee at the dealership that goes from car to car with an OBD plugin device to get the vehicle metrics like battery levels, tire pressure, transmission condition, fuel levels etc. This solution addresses all of the issues mentioned above by automating the verification process so there would be no need for an auditor to visit the dealership in person.

There has not been a solution along these lines to-date that would enable the dealers, banks, financial institutions or third party vendors managing inventories for dealers to automate the asset verification process.

In one aspect, there is provided a method for remote verification of an inventory asset in a floorplan inventory, comprises: sending a verification request originating from a third party from a client device remote from a dealer site to a data center; processing the request on the data center; routing the request from the data center to the appropriate remote server, wherein the server is associated with an automobile dealership; receiving the verification request at the remote server, thereby triggering a transmitter connected to the remote server via hardware or wireless connection; transmitting the verification request from the transmitter to a plurality of receivers arranged in a network, wherein each receiver is associated with an inventory asset of the floorplan inventory, the network of receivers arranged in a connected network topography; upon receiving the request, communicating the request amongst the receivers until the asset matching the verification request is located; responding to the request with a vehicle record associated with the asset, wherein the vehicle record comprises a list of set of data, comprising one or more of a VIN, make, model, price, mileage, geo-location; sending the vehicle record from the receiver to the remote server; and responding from the server to the data center.

In accordance with another aspect, there is provided a non-transitory computer-readable medium having recorded thereon a program that causes a portable device to execute a method for verifying an inventory asset, comprising sending a verification request originating from a third party from a client device remote from a dealer site to a data center; processing the request on the data center; routing the request from the data center to the appropriate remote server, wherein the server is associated with an automobile dealership; receiving the verification request at the remote server, thereby triggering a transmitter connected to the remote server via hardware or wireless connection; transmitting the verification request from the transmitter to a plurality of receivers arranged in a network, wherein each receiver is associated with an inventory asset of the floorplan inventory, the network of receivers arranged in a connected network topography; upon receiving the request, communicating the request amongst the receivers until the asset matching the verification request is located; responding to the request with a vehicle record associated with the asset, wherein the vehicle record comprises a list of set of data, comprising one or more of a VIN, make, model, price, mileage, geo-location; sending the vehicle record from the receiver to the remote server; and responding from the server to the data center, for further storage and processing by application modules of the data center.

In accordance with another aspect, there is provided a method of remotely updating a sale price of a vehicle, comprises: entering, via a user input on a portable electronic device, a price to be displayed on an electric tag associated with a vehicle in a dealer inventory using input means on the portable electronic device, wherein price is inputted as a numerical value; transmitting the inputted price of the vehicle to a data center, wherein the price is stored on a server of the data center in association with a vehicle record corresponding to the vehicle in the dealer inventory for which the price is being updated; forwarding the updated price to a remote server, whereon the price is stored in association with a dealer record corresponding to the vehicle for which the price is being updated; communicating with a transmitter connected to the remote server and transmitting the updated price from the transmitter connected to the remote server to a receiver associated with the vehicle in the dealer inventory for which the price is to be updated; receiving the updated price by the receiver associated with the vehicle in the dealer inventory for which the price is to updated; and displaying the price on a display screen associated with and in communication with the receiver.

In accordance with another aspect, there is provided a non-transitory computer-readable medium having recorded thereon a program that causes a portable device to execute a method for remotely updating a sale price of a vehicle, comprises: entering, via a user input on a portable electronic device, a price to be displayed on an electric tag associated with a vehicle in a dealer inventory using input means on the portable electronic device, wherein price is inputted as a numerical value; transmitting the inputted price of the vehicle to a data center, wherein the price is stored on a server of the data center in association with a vehicle record corresponding to the vehicle in the dealer inventory for which the price is being updated; forwarding the updated price to a remote server, whereon the price is stored in association with a dealer record corresponding to the vehicle for which the price is being updated; communicating with a transmitter connected to the remote server and transmitting the updated price from the transmitter connected to the remote server to a receiver associated with the vehicle in the dealer inventory for which the price is to be updated; receiving the updated price by the receiver associated with the vehicle in the dealer inventory for which the price is to updated; and displaying the price on a display screen associated with and in communication with the receiver.

In another aspect, there is provided a system for vehicle inventory management comprises: a client device; a data center comprising a processor, memory, and one or more of an application module; a remote server connected to a transmitter; and a plurality of receivers, each receiver associated with a vehicle within a vehicle inventory floorplan of a dealership and wherein the receivers are arranged as a network, and in one embodiment as a mesh topography, relay, or hub and spoke topography; the system configured for sending a vehicle verification request via the client device to the data center for processing, whereby processing comprises transmitting the verification request from the transmitter to the plurality of receivers over a wireless communication network, and verifying the presence of a requested vehicle in the vehicle inventory upon retrieval of vehicle information associated with the requested vehicle of the vehicle verification request by the receiver, and subsequent transmission of vehicle information of the requested vehicle to the data center In one embodiment, the system and method are configured to generate inventory reports with missing inventory objects, internal diagnostics of the vehicles and provide notifications to a user when various parameters, such as a set threshold is exceeded.

In one embodiment the system and method operates in an exemplary network environment including one or more of a client terminal, one or more of a server, wherein the terminal and server communicate wirelessly over a LAN or WAN network. In one embodiment, the client terminal comprises a laptop computer, desktop computer, a tablet, a smartphone, or other suitable device. In one embodiment, the server is a server device connected to the client via a LAN or WAN, or also a cloud server.

BRIEF DESCRIPTION OF THE DRAWINGS

Embodiments of the invention are further described hereinafter with reference to the accompanying drawings, in which.

DETAILED DESCRIPTION OF THE INVENTION

In one embodiment, the request originates from the user's end through an interface provided on a web portal or a mobile application. In one embodiment, the system is configured so that a user must provide one or more of a log-in credential to enter the system and initiate a request. In one embodiment, the request is transmitted to one or more of a web servers in a cloud-based datacenter via an http/https protocol (internet). An application server of the data center then instructs the system to route the request to an appropriate dealer's server, referred to as a remote server, based on the details in the incoming request. In another embodiment, the request is received on the dealer's server, and a transmitter associated with the server is triggered. In one embodiment, the transmitter is configured as a base station that communicates with a plurality of receivers. The receiver, or receiver base station, may be hardwired, or connected to the server through a Wi-Fi network, or other configurations as known in the art, such as Zigbee. In one embodiment, the transmitter/base station sends a signal wirelessly to the plurality of receivers associated with vehicle inventory, in order to verify an asset in an inventory floor plan. In another embodiment, the receivers that receive this request from the transmitter are all connected in a wireless software-driven network that enables the receivers to communicate with the transmitter in order to exchange data, gather data, and compose a response to the request with all of the inventory details and/or associated data that has been requested in the initial response.

In one embodiment, the system is comprised of hardware devices, including but not necessarily limited to one or more of a transmitter device and one or more of a receiver device, wherein the transmitter device and receiver device are configured to communicate with each other over a network, such as a wireless network. In one embodiment, the transmitter device is configured to recognize an incoming request, such as a request sent via communications over the internet. In another embodiment, the transmitter is configured to initiate and send a request out to a plurality of receiver devices connected in a wireless software network (configured to relay data along the network). In one embodiment, in the software network, one or more wireless (receiver) devices can be connected through other wireless receivers and can have a plurality of communication paths. In yet another embodiment, the transmitter is configured to communicate, to receive, to process, and to correlate the responses sent by return from one or more receivers in the plurality of receivers in the wireless software network, in response to the requests that had been sent out from the requesting transmitter.

In one embodiment, a plurality of receiver devices is arranged and implemented in a wireless software network; in which each node (receiver) of the network relays data for the network. All nodes cooperate in the distribution of data in the network and relay the communication of data associated with the inventory objects to/from the transmitter. In another embodiment, a receiver is associated with each inventory object of an inventory, and is configured to process, to store, and to communicate data regarding the inventory object to one or more of a transmitter associated with the system. In yet another embodiment, the receiver is configured to receive, to transmit, and communicate responses to one or more requesting transmitters.

In one embodiment, the system comprises a mobile application configured for execution on the client terminal. In one embodiment, the client terminal is a laptop, a tablet computer, a smartphone, or other portable electronic device capable of wireless communications and data processing. In another embodiment there is provided a non-transitory computer-readable medium having recorded thereon a program that causes a portable device to execute the process and method described herein.

In one embodiment, a method for verifying the presence or absence of an inventory object (asset) in the inventory or the internal diagnostic details, comprises: sending a request from a client terminal asking to verify the presence of an inventory object at a site remote from the client terminal; receiving the request at a data center connected to transmission system of a floor plan inventory; transmitting the request amongst one or more of receivers connected in a network, wherein the software network is distributed amongst inventory objects of the inventory; verifying the presence of the inventory object and its diagnostic details by receiving a responsive transmission from the receiver connected to the inventory object; compiling a data set regarding inventory object details and geo-location of the object, and delivering the list of inventory object details matching the request to the client terminal initiating the inventory object verification request.

In one embodiment, a method for verifying the presence or absence of a specific inventory object within a greater inventory of objects, comprises: sending a request from a transmitter device in response to a user request to verify the presence of a specific object, at a site remote from the user; transmitting the request out amongst a plurality of receivers connected in a wireless software network, wherein this network is distributed amongst all objects of the inventory and the receivers are physically associated with the objects; verifying the presence of the object by receiving a responsive transmission from the receiver connected to the inventory object; compiling a data set regarding inventory object details and geo-location of the object, and delivering the list of inventory object details matching the request to the transmitter.

In one embodiment, a system for verifying the presence of a specific inventory object within an inventory floor plan comprises: a portable terminal configured with a user interface for initiating a request to verify the specific inventory object; one or more of a transmitter device for communicating requests to verify the specific inventory to a third party in control of the inventory floor plan; a plurality of receivers associated with inventory objects of an inventory and arranged in a wireless software network and in communication with the one or more transmitter devices, whereby the receivers are configured to communicate amongst the software network to verify the presence of the specific inventory object and to return one or more of identifying details about the inventory object for delivery to the portable terminal configured for initiating the request.

In one embodiment, the verification process is web-enabled. In one embodiment, the request for verification includes key parameters, such as dealer identification, bank identification, passwords, and other optional fields, such as a single-object verification versus all inventory verification. In one embodiment, the system routes a request from a verifying source, such as a Dealer, third party inventory manager or financial institution, to a signal transmitter at an automobile dealership. In one embodiment, a signal is then transmitted to all receivers or to a specific receiver connected to each inventory object. In another embodiment, the receivers are connected and configured for enabling the network to overcome any network issues/latencies and respond back to a verification request in a timely manner. In another embodiment, the receivers in the inventory objects are connected to the object's OBD (On-Board Diagnostics) port to gather details, such as vehicle identification number (VIN), fuel and battery levels, transmission issues, engine problems, etc. and uses the on-board GPS Chip in order to geo-locate the object. In yet another embodiment, the receivers on the inventory objects communicate with each other and reply back with a list of objects in the inventory with VINs, their internal details, their location coordinates, etc, in order to verify the inventory floor plan.

Attention is now drawn to the Figures, which show various embodiments of the invention. The figures are illustrative, but not exhaustive.

Figure 1:
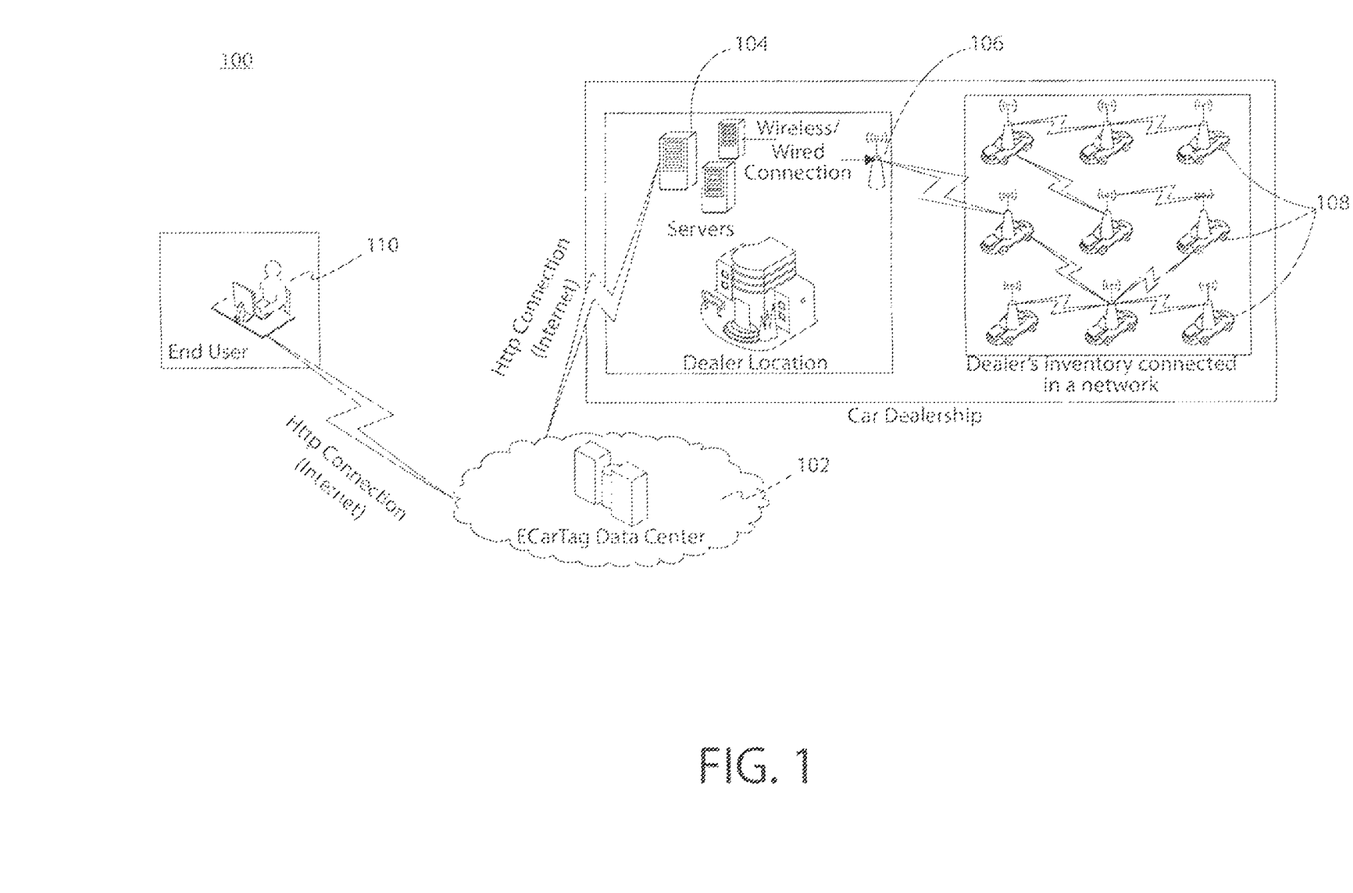
FIG. 1 shows an overview of an exemplary inventory management system according to one embodiment of the present invention.

FIG. 1 shows an overview of an inventory verification system 100, comprising a data center 102 in communication with one or more of a server 104, the server configured for connection to one or more of a transmitter 106, the transmitter in communication with a plurality of receivers 108, wherein each receiver is associated with a vehicle in a vehicle inventory, the data center configured to receive a request for vehicle data from a client terminal 110 and route the request by wireless communication from transmitter 106 to the plurality of receivers 108, in order to retrieve vehicle data from the receiver associated with a particular vehicle designated in the request. System 100 is configured to allow a user to remotely verify the floorplan inventory of an automotive dealership, and to retrieve particular data associated with an item of inventory.

Verification request is meant to include: requests to confirm a vehicle as part of a vehicle inventory; requests to retrieve vehicle data, including but not limited to: VIN, mileage, make of vehicle, model, year, MSRP; and requests to retrieve data from the on-board diagnostics system of the vehicle.

Data center 102 comprises a processing unit, an application server, and memory. In another embodiment, the data center comprises communication means for communication with client terminal and one or more remote servers. In one embodiment, data center communicates via a wired or wireless connection. In another embodiment, data center comprises access via a web-based portal utilizing an http-protocol. In another embodiment, data center is further configured with one or more of an API for processing requests, such as processing carried out by application server.

In one embodiment, the application server associated with data center may include one or more applications for processing verification requests. In one embodiment, an inventory verification application is a software application that includes instructions that when executed allow a portable device to remotely verify a vehicle in a dealer inventory, as further disclosed herein. In another embodiment, application server comprises an application for customer-facing processes to accept the verification request and display the response with the inventory details; an application for processing the verification request, routing it to the proper dealership to verify the appropriate vehicles in question; and another application to correlate the responses received related to one or more vehicles in inventory with appropriate requests.

Memory may include any type of memory device. For example, memory may include volatile memory such as static random access memory (SRAM), or nonvolatile memory such as FLASH memory. Memory is encoded with (or has stored therein) one or more software modules (or sets of instructions), that when accessed by processor, result in processor performing various functions. In some embodiments, the software modules stored in memory may include an operating system (OS) and applications, including but not limited to an analytics application. Memory represents a computer-readable medium capable of storing instructions, that when accessed by the processor, result in the processor performing as described herein.

Server 104 may be a server residing on-site at an automotive dealership, or may be a cloud-based server. Server 104 may be connected to transmitter 106 via a wired or wireless connection. Server is also referred to as remote server, in that the server need not be physically located or in geographic proximity with the client terminal, or the user initiating the verification request, and to indicate that the server is associated with a dealership, which may be remote from the user.

The system is configured to receive a verification request from client terminal 110. In one embodiment, the client terminal is a laptop computer or other portable electronic device with a connection, via http or other suitable protocol, to data center 102. In another embodiment, the client terminal is a portable electronic device such as a laptop, smart phone or tablet connected to data center via an Internet connection or other suitable wireless connection. Verification requests received by the data center are routed to the appropriate dealer server, where the verification request is sent from the transmitter to the network of receivers associated with the dealer inventory.

Receiver 108 is connected to the on-board diagnostic system of the vehicle to which it is associated. In one embodiment, the OBD device is configured with a wireless chip to communicate with the access point, or central hub, to aggregate the responses received before relaying it over to the transmitter. In another embodiment, receiver is configured with GPS capabilities.

In one embodiment, receiver is configured as a device comprising a processor, a memory, a display, communication means, such as Wi-Fi or cellular radio, and/or near field communications (NFC) radio. In one embodiment, the receivers are arranged for communication with each other and to the base station and may be arranged as a network or network topography, including but not limited to a mesh topography, relay, or hub and spoke topography In one embodiment, receiver comprises an electronic tag. In one embodiment the electronic tag is configured for communication with the OBD system of the vehicle to which the receiver is assigned. In another embodiment, receiver comprises memory on which instructions are stored, for example instructions for processing vehicle data and data collected from the OBD. In yet another embodiment, receiver is configured with a display screen, such as an LCD screen for display of vehicle data, such as vehicle price, or statistics from the OBD, such as battery level; oil level; mileage; maintenance alerts, other internal diagnostic data, and the like.

Receiver 108 responds back to request with data related to vehicle inventory, its internal diagnostic details and the geo-location of the vehicle. In one embodiment, the response includes geo-coordinate data relating to the location of the vehicle; data retrieved from the OBD; or other data associated with the tag, such as price of vehicle, VIN, mileage, make or model, tire pressure, fuel level, engine failure or electrical failure messages that are available through the OBD of the vehicle.

In one embodiment, receivers are connected to the transmitter wirelessly using an electronic self-healing network connection that has capability to route through multiple paths to traverse the entire connected network of objects that enables multiple vehicles to communicate with and reply back to the request of the transmitter with the details requested.

Transmitter 106 relays the data from the receivers to the dealer-associated server 104, where it may be temporarily be stored in an electronic record before it is relayed on to the server. In one embodiment, transmitter is configured with communications means, for communicating with the plurality of receivers, such as Wi-Fi or cellular radio, and/or near field communications (NFC) radio.

In one embodiment, client terminal 110 is a user device, such as portable electronic device whereon an inventory verification and management application is installed. The device includes a processor, a memory, a display controller, communication means, such as Wi-Fi or cellular radio, and/or near field communications (NFC) radio. The portable electronic device may be a cell phone, a smartphone, a tablet computer, a laptop computer, or the like. The processor may be any type of processor capable of executing instructions stored in memory and capable of interfacing with the various components shown in FIG. 1. The display controller provides means for user input, such as sending a verification request, selecting a dealership from a list of dealerships, or access a user portal of the vehicle inventory management system.

Figure 2:
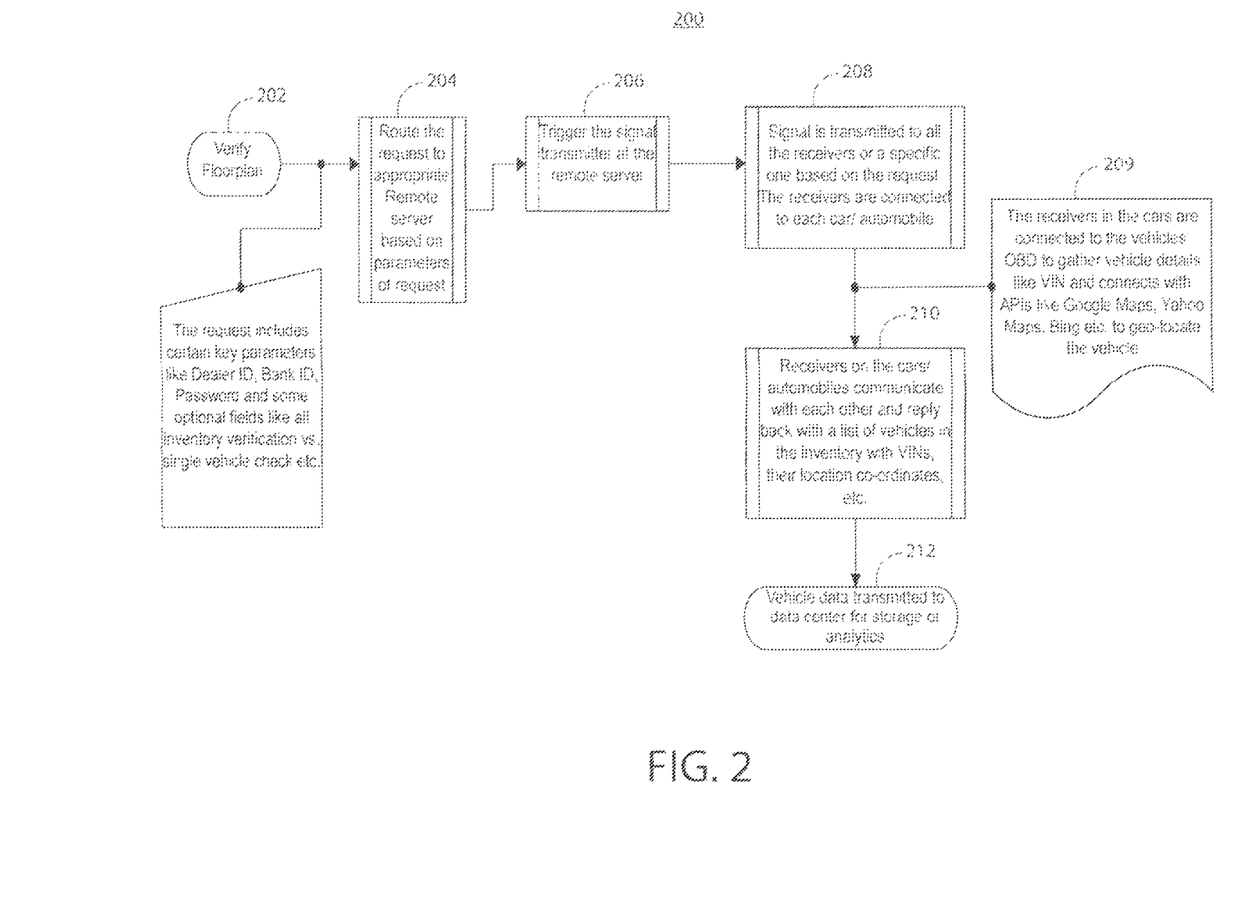
FIG. 2 shows an overview of an inventory verification process according to one embodiment of the present invention.

FIG. 2 shows an overview of a vehicle verification process 200 according to one exemplary embodiment of the invention. At step 202 a request is received from a user on a portable electronic device and sent wirelessly to a data center where, based on parameters identified by the user, the request is routed at step 204 to the appropriate remote server associated with the dealership identified in the user request. At step 206, the remote server triggers the server-associated transmitter, which in turn transmits at step 208 the request form the transmitter to a plurality of receivers 208 associated with inventory at the dealership site. The network of receivers are configured to enable the network to overcome any network latencies and respond to requests in real-time. The receivers may also be connected to the respective vehicles OBD (step 209) in order to gather vehicle data, such as VIN; receivers also are configured to connect with APIs of mapping programs, such as google maps, in order to geo-located the vehicle. The network of receivers communicate amongst one another at step 210 and reply back with the details requested of the particular vehicle or vehicles identified in the request parameters. The data center then confirms that the verification request has been satisfied by communicating the vehicle data back to the user device at step 212, and the data center may store data associated with the request on me memory associated with data center and for future processing by application modules associated with the data center.

Figure 3:
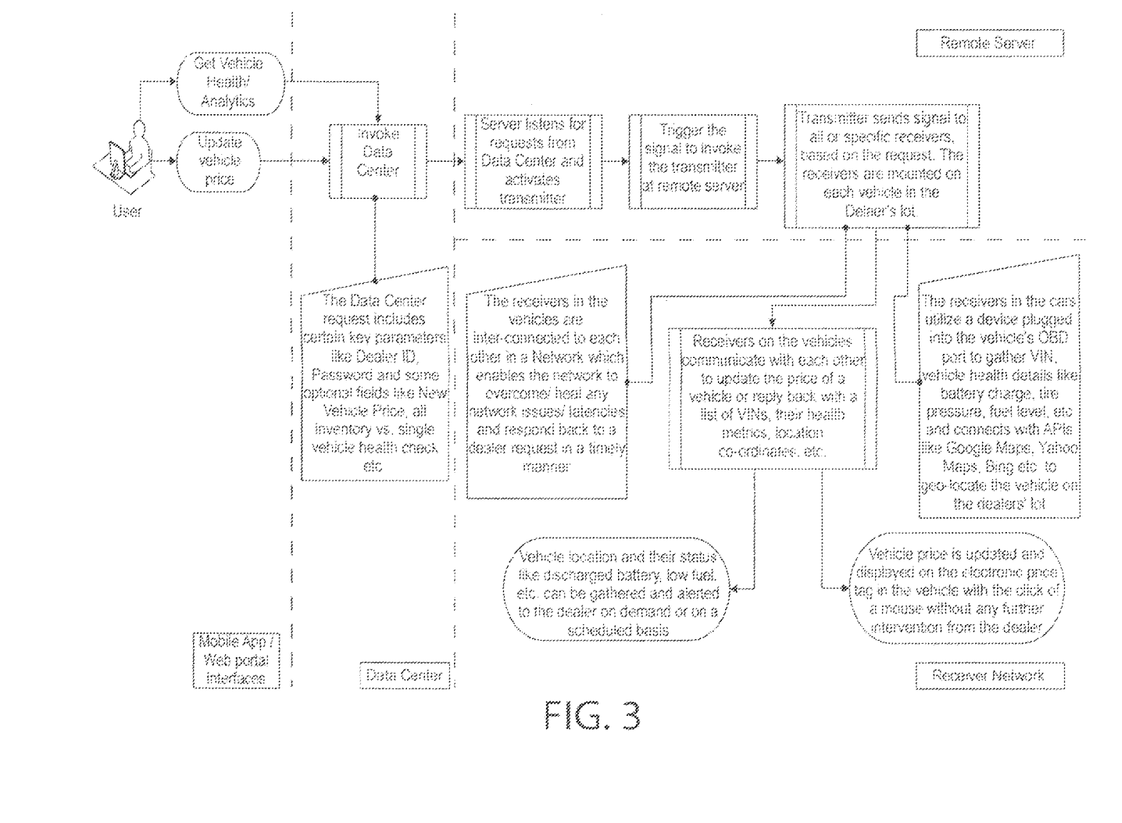
FIG. 3 shows an overview of an exemplary system and process for inventory management according to one embodiment of the present invention.

FIG. 3 shows an exemplary system and process for inventory verification of inventory at a dealership remote from a user making a request for inventory verification.

A verification request is initiated by a user by logging into a portal or a mobile application with a unique ID and password. The user then selects the dealership of interest from a list of pre-formatted dealership information, and initiates a verification request for an individual vehicle, a set of vehicles, or the whole inventory of vehicles.

In one embodiment, the request from the user portal would contain some key parameters, including but not limited to: Dealer ID, Password, type of request, and may include optional fields such as the make and model of vehicle.

In one embodiment, the request from the user's portal would invoke a data center and one or more servers of the data center, whereby the request is sent through the internet from the user portal to the data center.

In one embodiment, the data center comprises a processing unit on which resides an application module that is initiated upon receipt of the request by the data center and instructs the data center server to route the request to a remote server located at the selected dealership.

In one embodiment, the remote server connects to the server-associated transmitter through a wired or wireless connection and sends the details about the user request to the transmitter.

In one embodiment, the transmitter would send the request to the appropriate vehicles, such as those vehicles that need to verified, or that need a price update, or to all of the inventory that needs to be verified based on the parameters specified in the user's request.

In one embodiment, a plurality of receivers are connected to the vehicles in the dealer lot (one receiver per vehicle), and actively listening for user request transmissions from the transmitter.

In one embodiment, the plurality of receivers are wirelessly connected to the transmitter utilizing an electronic self-healing network connection configured to route through multiple paths to traverse the entire connected network of receivers, thereby the receiver system is enabled for all of the vehicles to communicate with and reply back to the transmitter with the details requested by the user request.

In one embodiment, the plurality of receivers are configured such that each receiver is connected to a vehicles' onboard diagnostics (OBD) system to retrieve details like vehicle identification number (VIN), type of vehicle, mileage on the vehicle, battery, fuel levels, tire pressure, transmission failure messages etc. that are available through the OBD port on the vehicle. In another embodiment, the receivers relay the information from the OBD to the data center, whereby an analytics module utilizes data from the OBD to manage vehicle inventory and update a vehicle record with information received from the OBD.

In another embodiment, the plurality of receivers are configured with GPS capabilities in order to determine the location of the vehicle. In yet another embodiment, the plurality of receivers are configured to be connected to an LCD display screen that displays vehicle data, such as the price of the vehicle.

In one embodiment, the transmitter receives vehicle data from the receivers and relays the data to the data center.

In one embodiment, the data center is configured to connect to a dealer data management system (DMS) to import vehicle data, such as but not limited to: price for the vehicle, days listed for sale, dealer lot physical floorplan, etc.

In one embodiment, the data center is configured to assemble the data received related to a vehicle inventory request and present the data in graphical format or tabular format, listing all of the details requested; and provided a geographic location of the vehicle by pinpointing the vehicles on the dealer's physical lot. In another embodiment, the data is presented to the user on a display screen of a portable device.

In one embodiment, a vehicle verification request may be initiated to verify the inventory floorplan of a dealership; to retrieve vehicle data such as—but not limited to—fuel level, battery level, and maintenance records; or to update the price of the vehicle. The user initiating the verification request accesses a web-based service via a client terminal. In one embodiment, the user request may include certain key parameters, such as the dealer identification, or other identifying information, such as the financial institution providing financing for the vehicle, authentication credentials, such as password or other log-in information.

In one embodiment, a user initiates a request by logging into a portal on a client terminal in connection with a data center and selecting a dealer from a list of dealerships. The request would include parameters for a specific vehicle of interest, an entire vehicle inventory, data related to a particular vehicle, or an aggregate of vehicle data. The request is routed by the data center to a server associated with the dealership to a transmitter that is either connected to the server with a hardwire or wireless connection, such as Wi-Fi or Zigbee, and the like, and transmitted to the inventory lot at the dealership to a plurality of receivers at a dealer lot, wherein each receiver is associated with a specific vehicle. Each receiver collects data from the vehicle to which it is connected, including data from the OBD of the vehicle and geographic coordinates of the vehicle location. When the receivers receive the request transmitted by the transmitter, the receivers responds back with information requested by the transmitter. In one embodiment, the transmitter, upon receipt of the response from the receivers, relays the information received to the server associated with the dealership. The dealership server then sends a response to the data center, to respond to the initial request. There are several parameters in the request that is sent by the user and relayed by the server in the dealership and the transmitter that helps the receiver differentiate the data needs of the user.

Figure 4A:
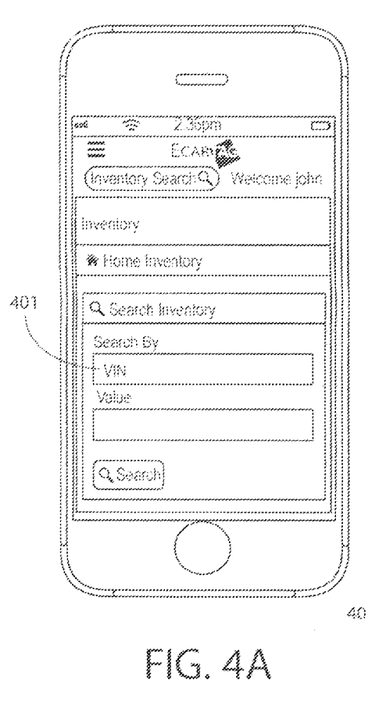
FIGS. 4A-C show mobile device screenshots of a vehicle inventory management application in accordance with various embodiments of the present invention.
Figure 4B:
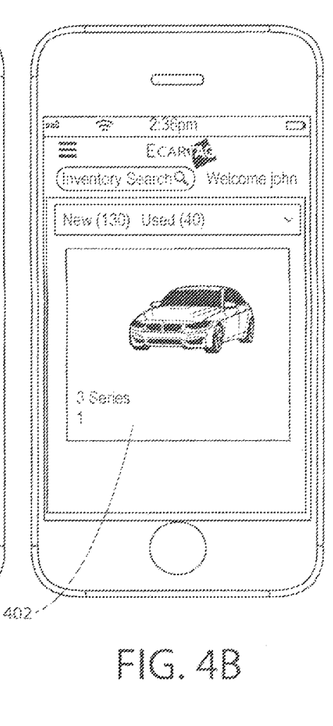
Figure 4C:
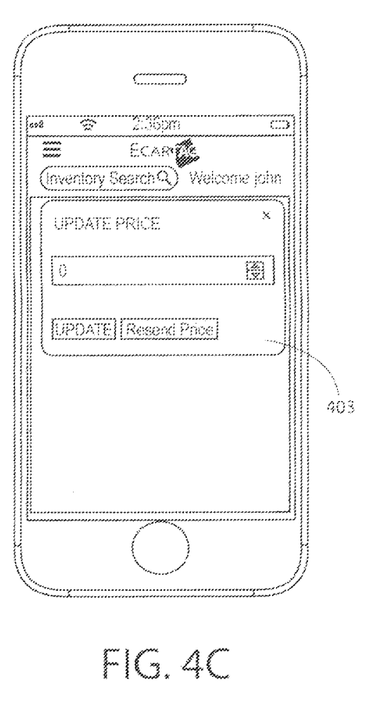

FIGS. 4A-4C show screenshots of a mobile application for vehicle inventory management, according to one embodiment of the present invention. FIG. 4A shows a vehicle verification request, wherein a search for a vehicle within a dealer inventory is based on input of a VIN into a search field 401 on a mobile device, wherein the VIN is input using a touch screen display of the mobile device. FIG. 4B shows a visual display 402 of a search result of a vehicle inventory of a dealership. FIG. 4C shows a display screen showing an input field 403 for updating a vehicle price, wherein an updated price may be entered into the input field and transferred from the device to the data center for further processing.

Figure 5:
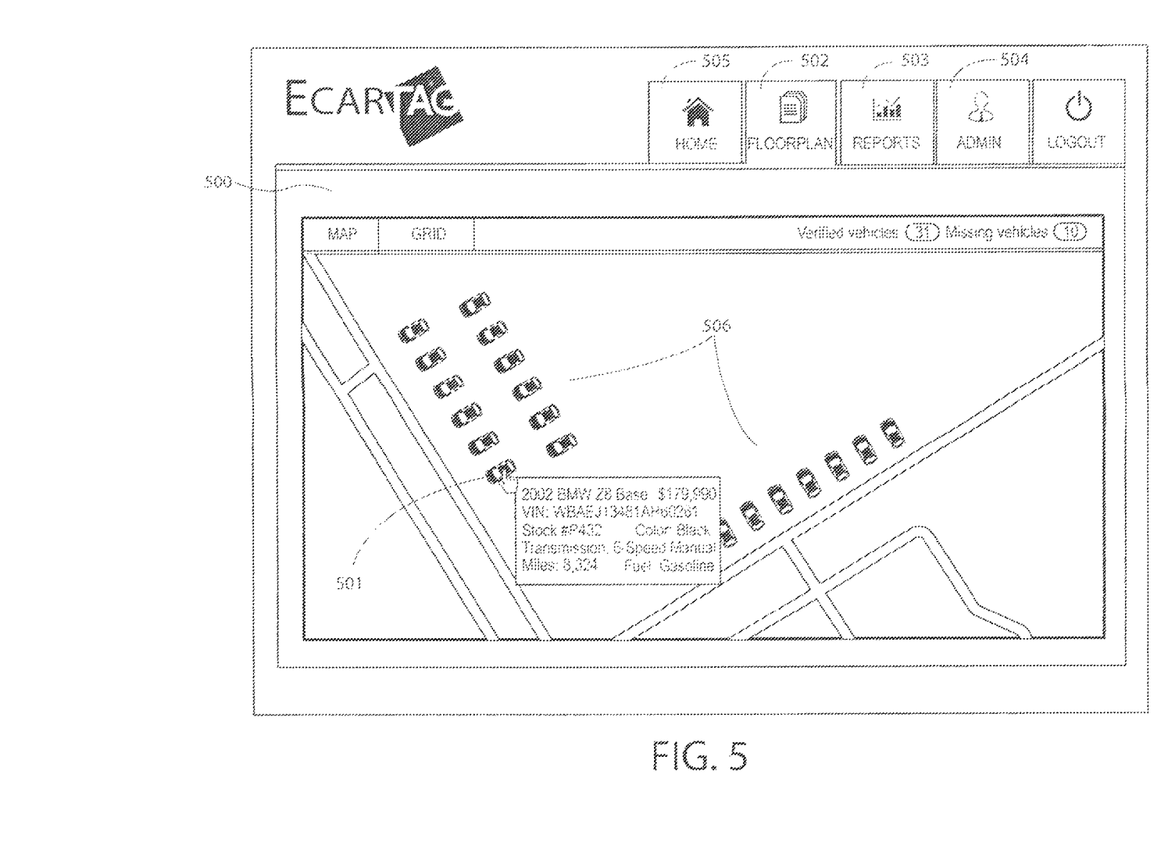
FIG. 5 shows a screenshot of a user portal according to one embodiment of the present invention, which displays results of a verification request and visual display of the geo-location of a vehicle within a vehicle inventory.

FIG. 5 shows a screenshot of a user portal 500 of a vehicle inventory management system, in which dealer floorplan 502 has been selected amongst various inventory management tools, including but not limited to a reports portal 503, admin portal 504, and homepage 505. Within floorplan 502, a particular item of inventory 501 is displayed: in this case, a vehicle identified by make/model; VIN; stock number; color; transmission; mileage; fuel type; and showing the geo-location of the vehicle within the vehicle inventory 506.

Figure 6A:
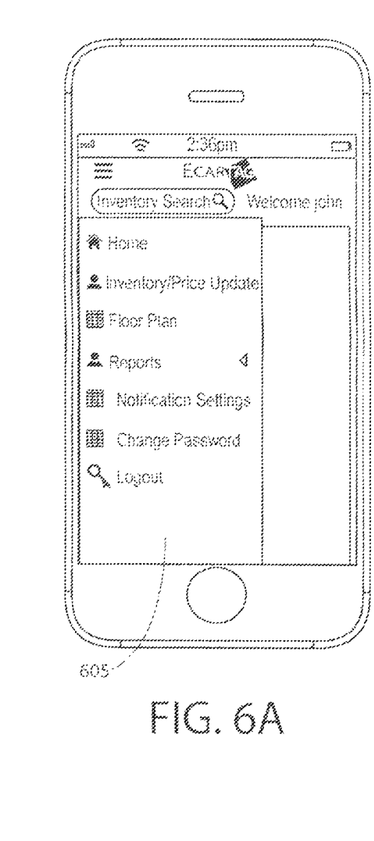
FIGS. 6A-C show mobile device screenshots of a vehicle inventory management application in accordance with various embodiments of the invention.
Figure 6B:
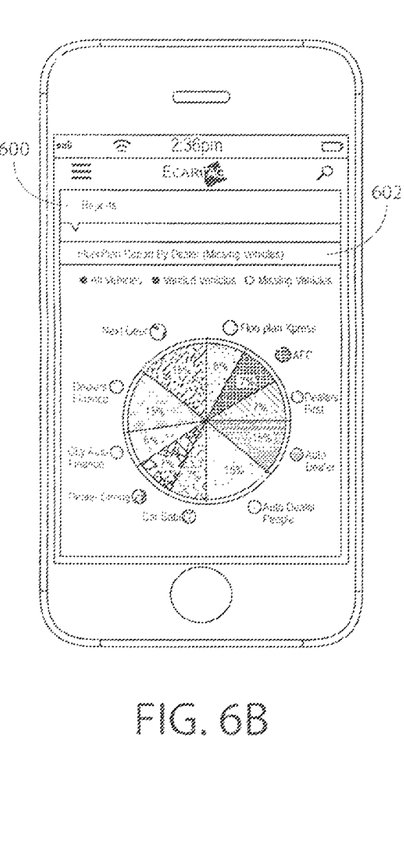
Figure 6C:
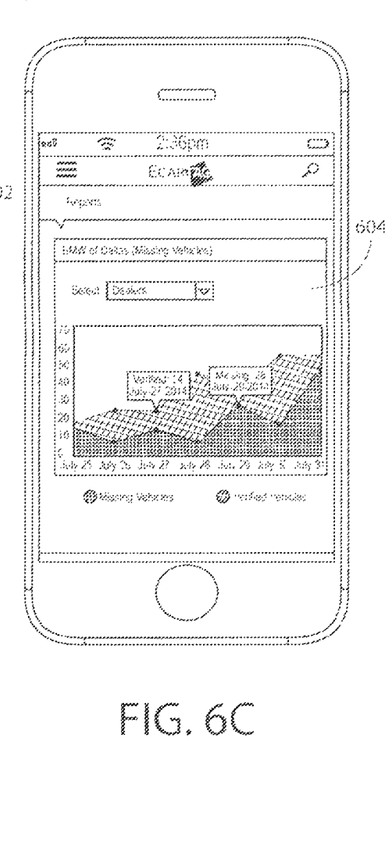
Figure 7:
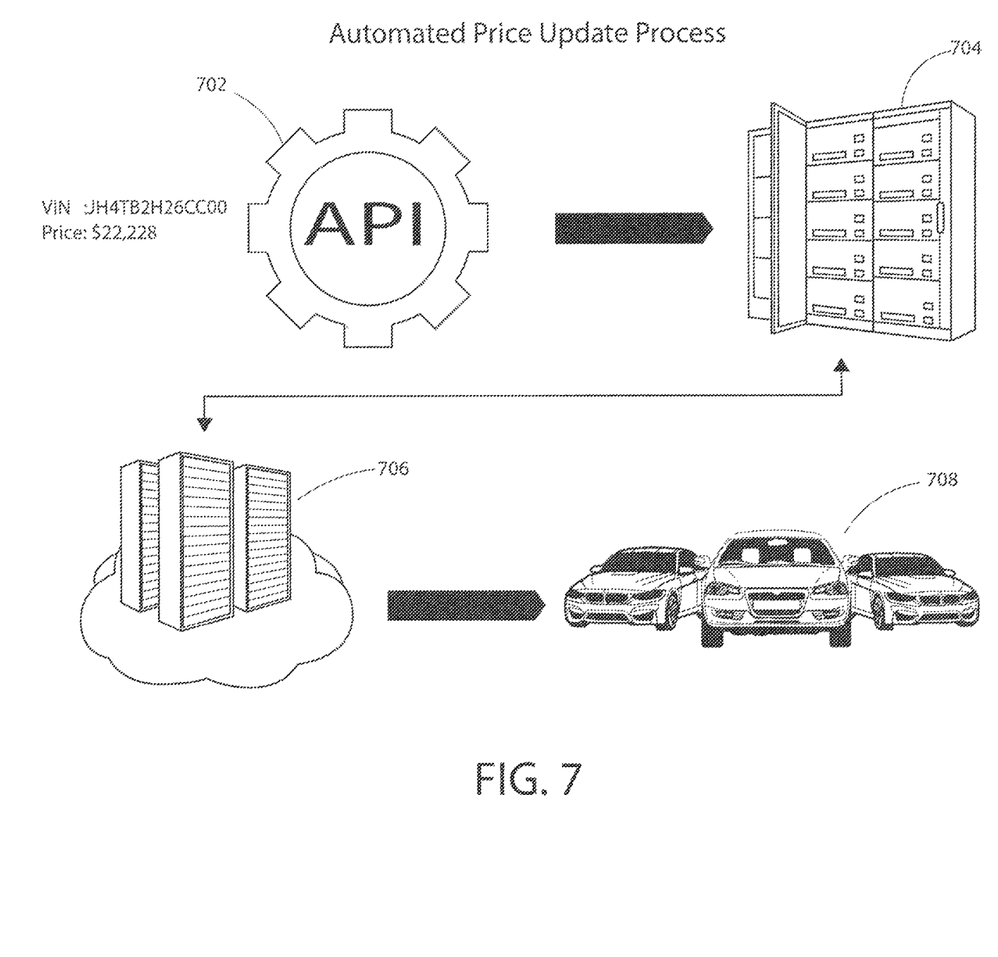
FIG. 7 shows a system for automated price updates according to one embodiment of the invention.

FIGS. 6A-C show mobile device screenshots of a vehicle inventory management application in accordance with various embodiments of the invention. In one embodiment, which is intended to illustrative but not exhaustive, a reports can be generated for a dealership based on historical data. Shown in FIG. 6A is a display screen 605 of a mobile device, showing various features and tools of the inventory management system that may be selected by a user, including but not limited to: reporting tool; floor plan tool; notification setting feature; inventory search feature; log-in portal feature. The features and tools allow a user to retrieve electronic records related to vehicle inventory from the mobile device, and to update a vehicle prices directly from the mobile device, by selecting the appropriate feature. Shown in FIG. 6B is a report 600 generated by an inventory management system on a mobile device, showing a floorplan report 602 by dealership, wherein the percentage of verified vehicles are graphically shown. Shown in FIG. 6C is a report 600 generated by an inventory management system on a mobile device, showing a report of missing vehicles 604 based on historical data of vehicles verified within an inventory to vehicles missing within an inventory, as a time-line for a particular dealership FIG. 7 shows a system 700 for automated price updates according to one embodiment of the invention. One or more of an API 702 customized for dealer-specific inventory is utilized to send pricing information associated with a particular VIN of a vehicle in a dealer inventory from a mobile device to data center 704, which in turn sends the pricing information to remote server 706 associated with the dealership inventory. The pricing information is then communicated to and updated on the electronic tag 708 of the vehicle, thereby creating an electronic record of the updated price of the vehicle.

It will be clear to a person skilled in the art that features described in relation to any of the embodiments described above can be applicable interchangeably between the different embodiments. The embodiments described above are examples to illustrate various features of the invention.

Throughout this disclosure, the words "comprise" and "contain" and variations of them mean "including but not limited to", and they are not intended to (and do not) exclude other components, integers or steps. Throughout the description, the singular encompasses the plural unless the context otherwise requires. In particular, where the indefinite article is used, the specification is to be understood as contemplating plurality as well as singularity, unless the context requires otherwise.

All of the features disclosed, and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed herein, or to any novel one, or any novel combination, of the steps of any method or process so disclosed.

We claim:

1. A method for remote verification of an inventory asset in a floorplan inventory, comprising:
   sending a verification request via an application module operating on a portable electronic device originating from a third party remote from a dealer site to a data center;
   routing the verification request from the data center to a remote server connected to a plurality of inventory assets associated with the verification request, and triggering a transmitter connected to the remote server via hardware or wireless connection;
   transmitting the verification request sent via the application module operating on the portable electronic device from the transmitter to a plurality of receivers arranged in a mesh network, wherein each receiver is co-located with an inventory asset of the floorplan inventory, the network of receivers arranged in a connected network topography;
   upon receiving the request, communicating the request amongst the receivers until the asset matching the verification request is located;
   responding to the request with a response message comprising a vehicle record associated with the asset, wherein the vehicle record comprises a list of data, comprising a VIN, vehicle model, vehicle price, mileage, geo-location;
   sending the response message comprising the vehicle record from the receiver co-located with the inventory asset to the remote server; and
   storing, via the application module, a record of the response message at the data center.

2. The method of claim 1, further comprising, storing data related to the request in an electronic record of the data center.

3. The method of claim 1, further comprising, generating, via the application module operating on the portable electronic device, a verification request response and sending the response for display on the third party client device.

4. The method of claim 1, wherein the asset is an automobile, a motorbike, a boat, or other motorized vehicle offered for sale by a dealership.

5. The method of claim 1, wherein the receiver associated with the asset is connected to an onboard diagnostic system of the asset and configured to retrieve system information of the asset.

6. A system, comprising: a client device; a data center comprising a processor, memory, and one or more of an application module; a remote server connected to a transmitter; and a plurality of receivers, each receiver co-located with a vehicle within a vehicle inventory floorplan of a dealership and wherein the receivers are arranged as a network; the system configured for sending a vehicle verification request via the application module on the client device to the data center for processing, whereby processing comprises transmitting the verification request from the transmitter to the plurality of receivers over a wireless communication network, and verifying the presence of a requested vehicle in the vehicle inventory upon retrieval of vehicle information associated with the requested vehicle of the vehicle verification request by the receiver, and subsequent transmission of vehicle information of the requested vehicle to the data center.

7. A non-transitory computer-readable medium having recorded thereon a program that causes a portable device to execute a method according to claim 1.

\* \* \* \* \*